United States Patent
Khoshnevis et al.

(10) Patent No.: US 10,433,187 B2
(45) Date of Patent: Oct. 1, 2019

(54) SYSTEM AND METHOD FOR UTILIZING MULTIDIMENSIONAL CONSTELLATIONS

(71) Applicants: Hossein Khoshnevis, Ottawa (CA); Ian Marsland, Ottawa (CA); Halim Yanikomeroglu, Ottawa (CA); Ngoc Dung Dao, Ottawa (CA); Nimal Gamini Senarath, Ottawa (CA)

(72) Inventors: Hossein Khoshnevis, Ottawa (CA); Ian Marsland, Ottawa (CA); Halim Yanikomeroglu, Ottawa (CA); Ngoc Dung Dao, Ottawa (CA); Nimal Gamini Senarath, Ottawa (CA)

(73) Assignee: Huawei Technologies Canada Co., Ltd., Kanata (CA)

( * ) Notice: Subject to any disclaimer, the term of this patent is extended or adjusted under 35 U.S.C. 154(b) by 89 days.

(21) Appl. No.: 15/097,784

(22) Filed: Apr. 13, 2016

(65) Prior Publication Data

US 2016/0309344 A1 Oct. 20, 2016

Related U.S. Application Data

(60) Provisional application No. 62/149,222, filed on Apr. 17, 2015.

(51) Int. Cl.
*H04W 24/02* (2009.01)
*H04L 1/00* (2006.01)
(Continued)

(52) U.S. Cl.
CPC .............. *H04W 24/02* (2013.01); *H04B 7/04* (2013.01); *H04B 7/0417* (2013.01); *H04L 1/004* (2013.01); *H04L 1/0058* (2013.01); *H04L 1/0643* (2013.01); *H04L 1/0668* (2013.01); *H04L 5/005* (2013.01); *H04W 72/1226* (2013.01)

(58) Field of Classification Search
CPC ... H04L 1/0643; H04L 1/0625; H04L 1/0631; H04L 1/0668; H04L 1/0618; H04L 5/005; H04L 1/004; H04L 1/0058; H04W 24/02; H04W 72/1226; H04B 7/04; H04B 7/0417

See application file for complete search history.

(56) References Cited

U.S. PATENT DOCUMENTS

2005/0047517 A1* 3/2005 Georgios ............. H04B 7/0417
                                                              375/267
2005/0130664 A1* 6/2005 Sang ................. H04W 72/1231
                                                              455/450

(Continued)

OTHER PUBLICATIONS

F. Oggier, G. Rekaya, J.-C. Belfiore, and E. Viterbo, "Perfect space-time block codes," IEEE Trans. Inform. Theory, vol. 52, No. 9, pp. 3885-3902, Sep. 2006.

(Continued)

*Primary Examiner* — Will W Lin

(57) ABSTRACT

Space-time block codes (STBCs) is a known approach for using multiple transmit antennas to provide higher data rates and better reliability by exploiting spatial diversity. Existing STBCs use independent two-dimensional constellations. Methods and systems for using multidimensional constellations to improve the performance of orthogonal STBCs are disclosed. Methods for finding optimized multidimensional constellations for orthogonal STBCs are also disclosed.

21 Claims, 8 Drawing Sheets

(51) Int. Cl.
*H04L 1/06* (2006.01)
*H04B 7/04* (2017.01)
*H04B 7/0417* (2017.01)
*H04L 5/00* (2006.01)
*H04W 72/12* (2009.01)

(56) References Cited

U.S. PATENT DOCUMENTS

| | | | | |
|---|---|---|---|---|
| 2005/0163243 | A1* | 7/2005 | Chung | H04L 1/0625 375/267 |
| 2006/0056539 | A1* | 3/2006 | Nam | H04B 7/0669 375/299 |
| 2006/0203928 | A1* | 9/2006 | Cheun | H04L 1/0631 375/267 |
| 2007/0281633 | A1* | 12/2007 | Papadopoulos | H04B 7/024 455/101 |
| 2008/0130769 | A1* | 6/2008 | Papadopoulos | H04B 7/022 375/260 |
| 2009/0003466 | A1* | 1/2009 | Taherzadehboroujeni | H04B 7/0669 375/260 |
| 2009/0225874 | A1* | 9/2009 | She | H04L 1/0631 375/260 |
| 2010/0202502 | A1* | 8/2010 | Tong | H04B 7/0619 375/224 |
| 2010/0220815 | A1* | 9/2010 | Ho | H04L 1/0668 375/316 |
| 2010/0254472 | A1* | 10/2010 | Wang | H04L 1/0643 375/267 |
| 2011/0149835 | A1* | 6/2011 | Shimada | H04B 7/024 370/315 |
| 2017/0126301 | A1* | 5/2017 | Taherzadehboroujeni | H04B 7/0669 |

OTHER PUBLICATIONS

V. Tarokh, H. Jafarkhani, and A. R. Calderbank, "Space-time block codes from orthogonal designs," IEEE Trans. Inf. Theory, vol. 45, No. 4, pp. 1456-1466, Jul. 1999.

H. Jafarkhani, "A quasi-orthogonal space-time block code," IEEE Trans. Commun., vol. 49, No. 1, pp. 1-4, Jan. 2001.

S. M. Alamouti, "A simple transmitter diversity scheme for wireless communication," IEEE J. Sel. Areas. Commun., vol. 16, No. 8, pp. 1451-1458, Oct. 1998.

H. Lee et al., "MIMO Systems Based on Mudulcation Diversity," IEEE Trans. Commun., vol. 58, No. 12, pp. 3405-3409, Dec. 1, 2010.

A. S. Mohammed et al., "Multidimensional 16-QAM constellation labeling of BI-STCM-ID with the Alamouti scheme," WCNC, Las Vegas, NV USA, pp. 1217-1220, Apr. 3-6, 2006.

H. Khoshnevis et al., "Irregular Multidimensional Constellations for Orthogonal STBCs," 2015 IEEE Global Communications Conference, pp. 1-5, Dec. 6, 2015.

International Search Report for International Application No. PCT/IB2016/052140 dated Sep. 6, 2016.

* cited by examiner

SYSTEM AND METHOD FOR UTILIZING MULTIDIMENSIONAL CONSTELLATIONS

CROSS-RELATED APPLICATIONS

This application claims priority to US Provisional Patent Application Ser. No. 62/149,222 filed Apr. 17, 2015 and entitled "SYSTEM AND METHOD FOR UTILIZING MULTIDIMENSIONAL CONSTELLATIONS", the entirety of which is hereby incorporated by reference.

TECHNICAL FIELD

This disclosure relates generally to wireless communications. More particularly, it relates to wireless systems with multiple antennas that use space-time block codes (STBCs).

BACKGROUND

As the demand for wireless communication systems increase, there is a need for communications systems and methods that provide networks with higher capacity and reliability. Multiple-input multiple-output (MIMO) techniques, based on multiantenna multiplexing and diversity, can be used to provide high data rates and better reliability. Space-time codes and subsequently space-time block codes (STBC) have been introduced as methods which efficiently use the available space-time resources in multiantenna communication systems. Orthogonal space-time block codes (OSTBCs), as one type of space-time code, can be used to improve diversity while only requiring a linear complexity decoder. Because of their low complexity in encoding and decoding, OSTBCs have been used widely.

However, there is a need for improved systems which can improve performance without adding undue complexity.

SUMMARY

One aspect discussed herein includes a method for wireless transmission. The method includes converting a data block to be transmitted into a set of P-dimensional symbols derived from an M-dimensional constellation, wherein $M \geq 3$ and $P<M$. The method further includes encoding the set of P-dimensional symbols to form a Space Time Block Code (STBC) matrix. The method further includes transmitting the STBC matrix. In some embodiments the encoding forms an Orthogonal STBC (OSTBC) matrix. In some embodiments, $M=PK$, with K being the number of symbols. In some embodiments $P=2$ and the 2-dimensional (2D) symbols are 2D components of the M-dimensional constellation. In some embodiments the data block is divided into groups of d bits and mapped to K 2D symbols of different 2D constellations which are projections of the M-dimensional constellation with $M=2K$. In some embodiments the K 2D symbols are encoded to form an OSTBC matrix such that 2D symbols of the OSTBC matrix carry dependent 2D components of the M-dimensional constellation. In some embodiments the 2D components include a real and an imaginary component. In some embodiments M-dimensional constellation is regular or irregular. In some embodiments the M-dimensional constellation used is selected from a group of possible M-dimensional constellations based on anticipated conditions which can affect the wireless channel. In some embodiments the M-dimensional constellation used is selected from a group of possible M-dimensional constellations based on conditions which affect the wireless channel and further comprising receiving a feedback signal from a receiver of the OSTBC which determines the M-dimensional constellation to be selected. In some embodiments the receiver makes channel statistic measurements and the feedback signal is dependent on the channel statistic measurements. In some embodiments the constellation is selected dependent on the distribution of fading channel coefficients. In some embodiments the transmitter adjusts other parameters of the system based on feedback from the receiver. In some embodiments the other parameters are selected from a list. Such a list includes the number of dimensions (M); the number of time slots; the number of pilots; and the forward error correction codes to be used. In some embodiments the transmitter further selects a forward error correction code to be used which corresponds to the selected M-dimensional constellation. In some embodiments the constellation is selected to optimize the constellation based on a bound on the performance and by using a constant average energy.

Another aspect discussed herein includes a transmitter. Such a transmitter includes a plurality (N) of transmit antennas. The transmitter also includes a converter for mapping a data block to two dimensional (2D) symbols derived from an M-dimensional constellation. The transmitter further includes a space time block code (STBC) encoder for encoding the 2D symbols onto an STBC transmit matrix for transmission by the N transmit antennas. In some embodiments the converter utilizes a transformation matrix derived from an M-dimensional constellation for converting the data block into the 2D symbols. In some embodiments the converter selects from a plurality of transformational matrices corresponding to a plurality of M-dimensional constellations. Some embodiments further include a receive interface for receiving a feedback signal from a receiver instructing the converter as to which of the plurality of transformational matrices to select. Some embodiments further include a processor and machine readable memory storing machine executable instructions for implementing the converter and the STBC encoder.

Another aspect discussed herein includes a receiver. The receiver includes a plurality of receive antennas. The receiver further includes a channel statistics module for measuring channel statistics. The receiver further includes a feedback module for providing a feedback signal to a transmitter as to which of a plurality of multidimensional constellations to use for transmission dependent on the measured channel statistics. In some embodiments the feedback module also provides feedback relating to other parameters of the system based on the measured channel statistics. In some embodiments the other parameters are selected from a list. Such a list includes the number of dimensions (M); the number of time slots; the number of pilots; and the forward error correction codes to be used.

Another aspect discussed herein includes a method for wireless transmission. The method includes mapping a data block to be transmitted to an M-dimensional co-ordinate point. The method further includes converting the M-dimensional co-ordinate point into a plurality of P-dimensional co-ordinates, wherein $M \geq 3$ and $P<M$, and transmitting the P-dimensional co-ordinates.

Another aspect discussed herein includes a method for wireless transmission. The method includes mapping a data stream onto a multidimensional constellation. The method further includes projecting the multidimensional constellation onto two-dimensional components for an OSTBC and transmitting the OSTBC. The two-dimensional components can include a real and an imaginary component.

The foregoing and other objects, features, aspects and advantages of the present invention will become more apparent from the following detailed description, taken in conjunction with the accompanying drawings, which description is by way of example only.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
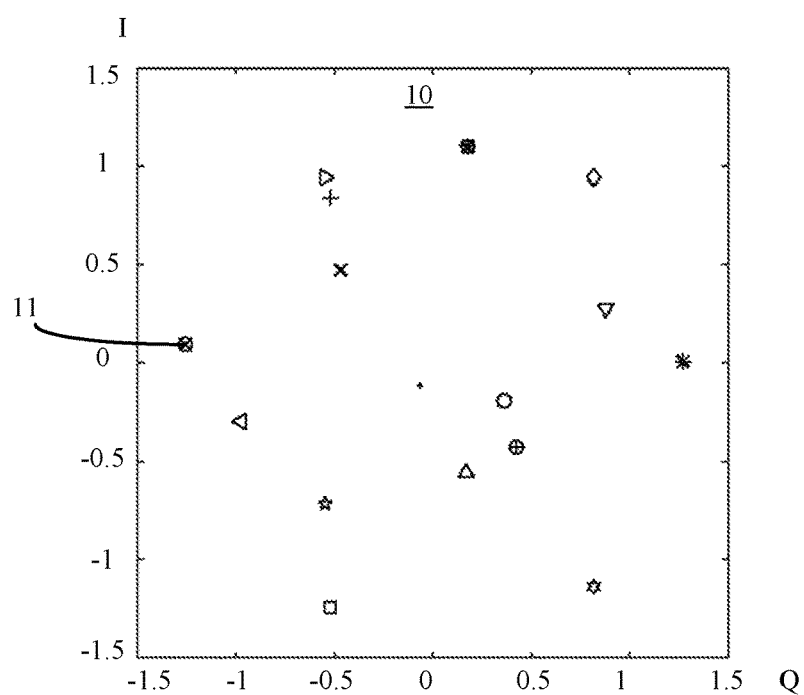
FIG. 1 is a sample optimized constellation according to an embodiment.
Figure 1:
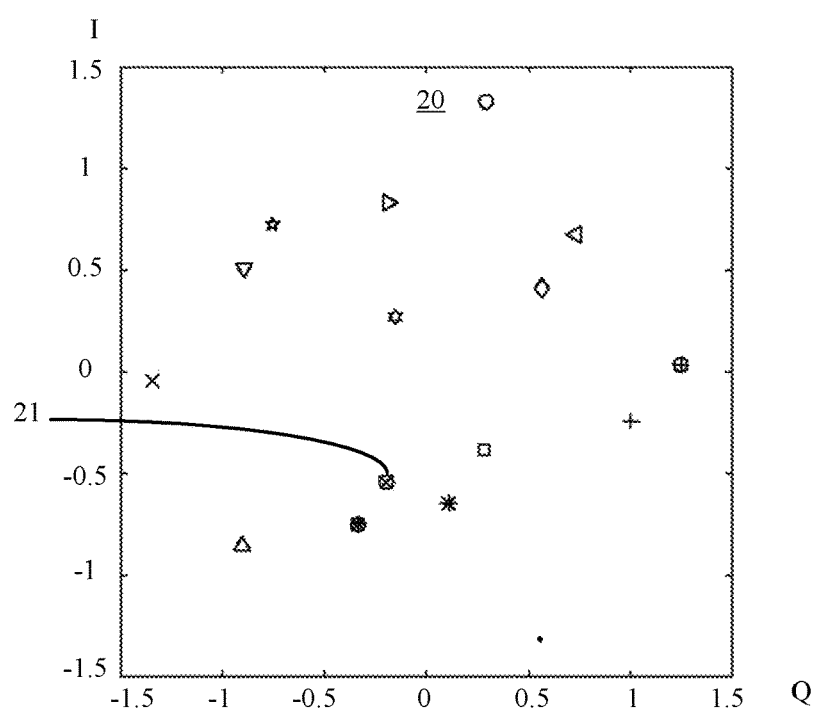

Utilizing multiple antennas at the transmitter and receiver can provide one of higher data rates and better reliability by exploiting spatial diversity. Space-time block codes (ST-BCs) are a simple approach for using multiple transmit and receive antennas that has been widely used in existing wireless networks. Conventionally, STBCs introduced in the literature use independent two-dimensional constellations.

In transmission, a data block is mapped to a two dimensional coordinate point defined by the constellation. This point is transmitted to a receiving entity to decode. STBCs can be used to encode pairs of coordinate points for transmissions in a manner that takes advantage of the transmit/receive diversity provided by the multiple antennae. Increasing the number of dimensions in a constellation allows for an increase in the distance between two arbitrarily selected constellation points, without necessarily moving either of the selected points substantially closer to a third constellation point. It is, however, well understood that increasing the size of a coordinate point can increase the complexity of encoding and decoding, using STBCs.

Some space-time codes are well-studied due to their simple encoding and decoding. Many STBCs employ traditional regular lattice-based two dimensional (2D) constellations such as rectangular or hexagonal QAM.

In an M-dimensional space (M≥3), each co-ordinate point is represented by M scalar values. In a 2D space, each co-ordinate point has 2 scalar values (for example X and Y, or I and Q). For M dimensional constellations (with M≥3), symbols are represented by coordinate points having three or more scalar values. The increase in the number of dimensions allows for increased separation between points in comparison to the widely used 2D constellations. In designing a constellation, the spacing between constellation points increases the error correction properties. Arbitrarily expanding the distance between constellation points in a 2D constellation runs into the limits of the dynamic range of the transmitter and receiver. Moving to a higher dimensional coordinate space, e.g. M≥3, provides the ability to increase the spacing between constellation points without requiring an increase in the dynamic range of the transmitters and receivers. To reduce the complexity associated with encoding and transmitting higher dimensional co-ordinate points using a transmission scheme such as OSTBC, a single M≥3 coordinate point is represented by a plurality of lower dimensional co-ordinate points. For example, a 4-D coordinate (A, B, C, D) is composed of 4 scalar values, and in the method described more fully below can be represented by 2 2D coordinates, e.g. (A, B) and (C, D). This allows an M=4 coordinate point to be represented as 2 K=2 coordinate points. Where in a conventional STBC two coordinate points representing different constellation points would be encoded together, the below discussed method allows for the 2 coordinate pairs representing the four dimensional point to be encoded using the STBC matrix. Current wireless physical layer standards, and wireless systems which adhere to them, require 2D constellations. Accordingly, embodiments disclosed below can utilize multidimensional constellations by projecting the multidimensional constellations onto a set of 2D signal spaces. For example, a multidimensional symbol in a four dimensional (4D) constellation can be transmitted using two 2D symbols, and each point (symbol) in the 4D constellation can be mapped to two points (symbols) in two 2D constellations.

FIG. 1 is a sample optimized constellation according to an embodiment. FIG. 1 illustrates a first 16-point 2D constellation 10 and a second 16-point 2D constellation 20 as 2D projections of a 16-point 4D constellation. In this figure, each 2D constellation point represents two dimensions of a 4D constellation point and points with the same label are indicated with the same marker. For example, both point 11 of 2D constellation 10 and point 21 of 2D constellation 20 represent projections of a corresponding point of the 4D constellation.

FIG. 1 also shows that constellation points in this scheme can be irregularly placed anywhere in the signal space (within the constraint of average energy), which provides more degrees of freedom for optimization. Optimization will be discussed below.

Multidimensional constellations can be described as being "irregular" if there are no constraints on the placement of the multidimensional symbols in the signal space (other than ensuring fixed average energy). "Regular" multidimensional constellations can be considered as special cases which are subject to additional constraints, such as the multidimensional symbols being restricted to vertices on a grid or lattice.

Figure 2:
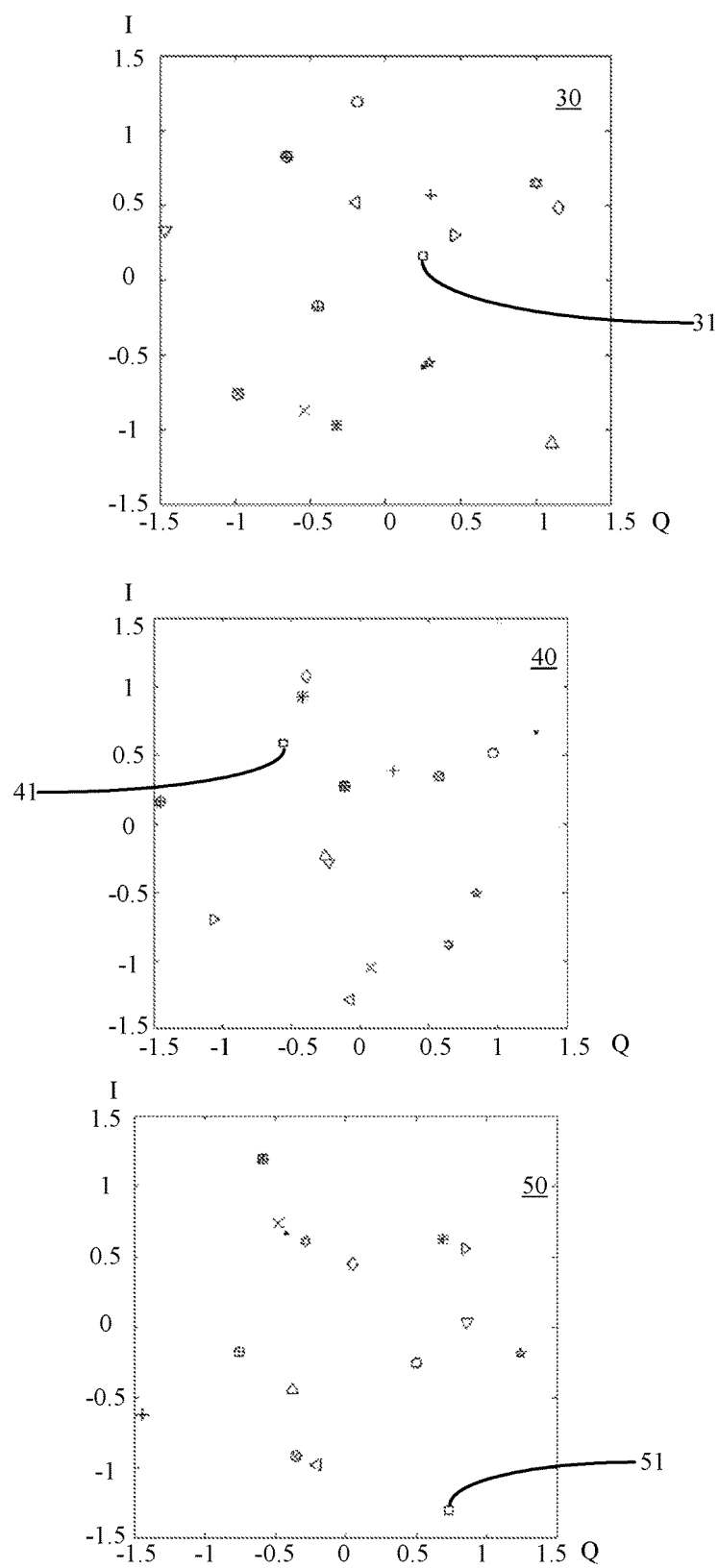
FIG. 2 illustrates constellations corresponding to the first, second and third two-dimensions of a 6D constellation according to an embodiment.

FIG. 2 illustrates constellations corresponding to the first, second and third 2D constellations which are projections of a six dimensional (6D) constellation according to an embodiment. In this figure, each 2D constellation point represents two dimensions of a 6D constellation point and points with the same label are indicated with the same marker. So, for example, point 31 of 2D constellation 30, point 41 of 2D constellation 40 and point 51 of 2D constellation 50 represent the three 2D projections of a corresponding point of the 6D constellation.

Figure 3:
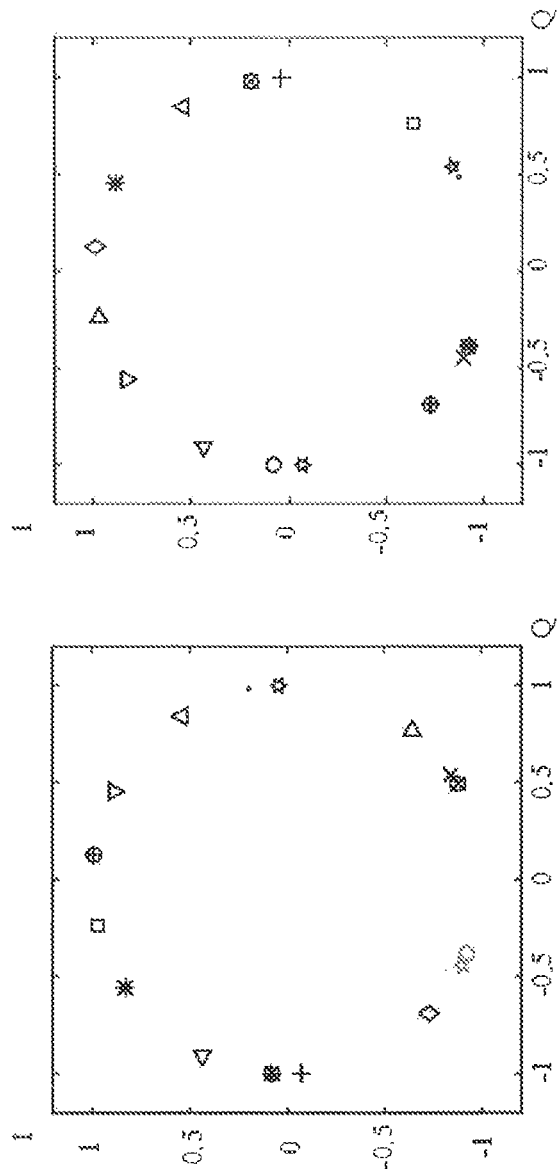
FIG. 3 illustrates a sample of optimized regular 4D constellations for 3 bits per channel according to an embodiment.

FIG. 3 illustrates a sample of optimized regular 4D constellations for 3 bits per channel according to an embodiment. Constellations corresponding to the first and the second two dimensions of a regular 4D constellation were optimized for 4D labeling which benefits from the simple structure of QAM. To contrast FIG. 3 and FIG. 1, FIG. 3 is an example of an optimized regular 4D constellation, whereas FIG. 1 is an example of an optimized irregular 4D constellation.

Typically, an OSTBC block carries K 2D symbols, with independent information content carried in each symbol. For embodiments which employ multidimensional constellations, each 2D component of a point in a 2K-dimensional constellation can be carried by one of the K different 2D symbols of the OSTBC.

An example system which consists of multiple transmit antennas that use STBCs will now be discussed. The system is equipped with $N_t$ and $N_r$ antennas at the transmitter and receiver, respectively, and each code block consists of L time slots. Each 2D symbol is transmitted through a slow flat fading channel denoted by the $N_t \times N_r$ matrix H, with elements $h_{ij} = \alpha_{ij} e^{j\phi_{ij}}$ where $\alpha_{ij}$ is a random variable representing channel gain. Its distribution may be Rayleigh distribution. The system can be described as:

$$R = GH + W, \qquad (1)$$

where R is the received matrix, G is the $L \times N_t$ transmitted STBC block, and W is zero-mean complex additive white Gaussian noise (AWGN) with variance $N_0/2$ per dimension. OSTBCs are general structures that can be employed for carrying data orthogonally over slow fading channels. Their simplest form, the known STBC proposed by Alamouti for two transmit antennas, can be written as:

$$G_0 = \begin{bmatrix} s_1 & s_2 \\ -s_2^* & s_1^* \end{bmatrix} \qquad (2)$$

In Code $G_0$, data are mapped separately to each constellation point and carried by 2D symbols $s_1$ and $s_2$, both of which are independent elements of a 2D constellation, $S_2$.

A known OSTBC for 4 transmit antennas, 4 timeslots, and 3 2D symbols is:

$$G_2 = \begin{bmatrix} s_1 & s_2 & s_3 & 0 \\ -s_2^* & s_1^* & 0 & s_3 \\ s_3^* & 0 & -s_1^* & s_2 \\ 0 & s_3^* & -s_2^* & -s_1 \end{bmatrix} \qquad (2A)$$

The general structure of OSTBCs for an arbitrary number of antennas ($N_t$) and time slots (L) is a block of size $L \times N_t$. Each OSTBC can carry K independent 2D symbols.

In some embodiments, in order to transmit multidimensional constellations using OSTBCs, their 2D components are distributed onto 2D OSTBC symbols. The data is divided into groups of d bits and accordingly mapped to 2D symbols of different 2D constellations which are projections of a 2K-dimensional constellation with a modulation order of $2^d$.

For example, by considering $s_1$ and $s_2$ used in $G_0$ as carriers of 2D components of a multidimensional constellation, Alamouti's scheme can be rewritten as:

$$G_1 = \begin{bmatrix} s^{(1)} & s^{(2)} \\ -s^{(2)*} & s^{(1)*} \end{bmatrix} \qquad (3)$$

where $s^{(k)}$ is the $k^{th}$ 2 D symbol for transmission of a multidimensional symbol $s = [s^{(1)}, s^{(2)}, \ldots, s^{(k)}]$ with $s \in S_{2K}$, a 2K-dimensional constellation. In $G_1$, data are mapped to two 2D symbols of a 4D multidimensional symbol for transmission using current physical (PHY) layer standards, and the 2D symbols are carried by $s^{(1)}$ and $s^{(2)}$. As an example, to provide a spectral efficiency of 2 bits per channel-use (bpcu), a 4-QAM constellation can be used for $s_1$ and $s_2$ in $G_0$ whereas a 16-point 4D constellation can be used for $s = [s^{(1)}, s^{(2)}]$ in $G_1$.

It is noted that in the prior art Alamouti constellation shown in equation (2), 2D symbols $s_1$ and $s_2$, are independent elements of a 2D constellation. However $s^{(1)}$ and $s^{(2)}$ in $G_1$ are jointly designed (i.e. dependent) in equation (3). This dependence comes from the fact that the 2D components (e.g. $s^{(1)}$ and $s^{(2)}$) are projections from the multidimensional constellation.

As another example, a 6D point from a 6D multidimensional constellation is divided into three 2D symbols for transmission using current PHY layer standards. In such a case for a four-antenna transmission, the four-antenna OSTBC shown above as equation (2A) can be rewritten for multidimensional constellation as:

$$G_2 = \begin{bmatrix} s^{(1)} & s^{(2)} & s^{(3)} & 0 \\ -s^{(2)*} & s^{(1)*} & 0 & s^{(3)} \\ s^{(3)*} & 0 & -s^{(1)*} & s^{(2)} \\ 0 & s^{(3)*} & -s^{(2)*} & -s^{(1)} \end{bmatrix} \qquad (4)$$

Further, by dropping the last column of $G_2$, the corresponding scheme for a three-antenna transmission of a 6D constellation can be written as:

$$G_3 = \begin{bmatrix} s^{(1)} & s^{(2)} & s^{(3)} \\ -s^{(2)*} & s^{(1)*} & 0 \\ s^{(3)*} & 0 & -s^{(1)*} \\ 0 & s^{(3)*} & -s^{(2)*} \end{bmatrix} \qquad (5)$$

Figure 4:
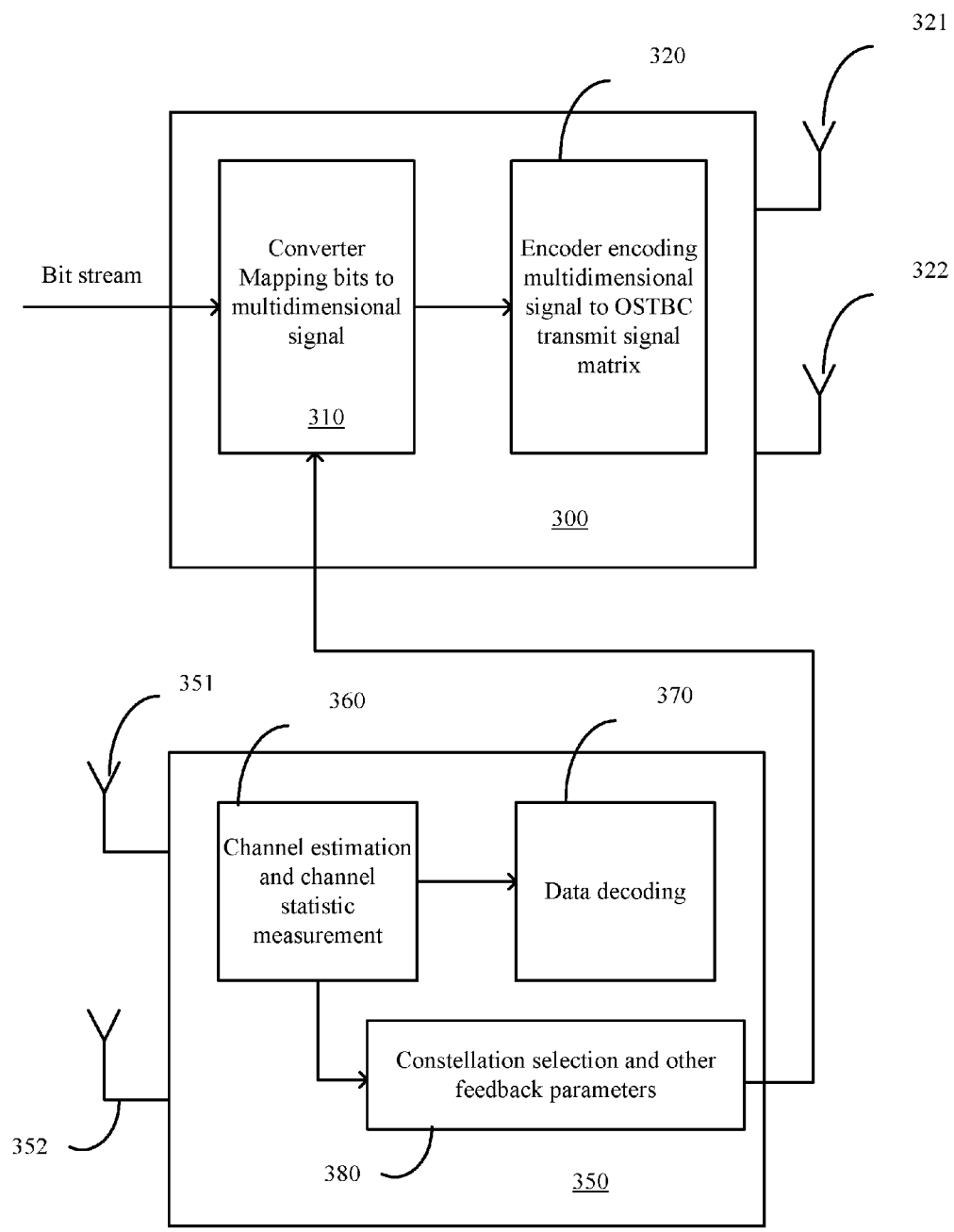
FIG. 4 is a block diagram illustrating a wireless system having a transmitter and receiver according to an embodiment.

FIG. 4 is a block diagram illustrating a wireless system having a transmitter (e.g. a base-station) and receiver (e.g. a terminal) according to an embodiment. Transmitter 300 converts and encodes a bitstream via transmit antennas 321 . . . 322. It should be noted that while this example shows two antennas for both the transmitter and receiver, this number is not necessary. Nor does the receiver need to have the same number of antennas as the transmitter. For example, the transmitter can have 4 antennas, as would be used to transmit an OSTBC having the form of $G_2$ of equation (4), whereas the receiver can have a single receive antenna. The transmitter includes a converter module 310 for mapping a data block (a set of bits from the bitstream) to a multidimensional signal. In some embodiments, the converter module 310 stores a codebook containing a plurality of possible multidimensional constellations. It should be appreciated that a codebook is not a requirement, and the term is meant to include similar mechanisms including tables, databases and math functions. The multidimensional signal will depend on the type of multidimensional constellation used by the converter, which can be selected from a number of potential multidimensional constellations, based on either anticipated or measured wireless conditions.

Encoder 320 then converts the multidimensional signal into a set of 2D symbols and encodes these symbols into an OSTBC matrix for transmission via the transmit antennas. It should be appreciated that once encoder 320 has converted the multidimensional signal into 2D symbols (for example symbols $s^{(1)}$, $s^{(2)}$ and $s^{(3)}$, assuming the 4 antenna, 4 timeslot, 3 symbol OSTBC for equation (4)), the encoder operates in a conventional manner to encode the OSTBC matrix of equation (4).

In this example, the receiver 350 receives the transmitted OSTBCs via receive antennas 351 . . . 352. Receiver 350 includes channel estimation and channel statistic measurement module 360, a data decoder module 370, and, in this example, a feedback circuit 380 to determine what constellation the transmitter should utilize, as well as providing system parameters to the transmitter. It should be appreciated that while a solid line is shown providing feedback from the feedback circuit 380 to the converter 410, such feedback will typically be provided wirelessly.

In some embodiments, the system can make fading channel assumptions as to the type of channel distribution (e.g., Nakagami or Rayleigh). However, if the channel model is different than assumed (or changes), then other signal constellations may provide better performance. Accordingly, in the embodiment shown in FIG. 4, the system can select from several constellations each optimized for different channel models, with the constellation selected by the receiver based on actual conditions as measured by the receiver, for example Nakagami, with different parameters. The receiver can estimate the channel model, select the best constellation and instruct the transmitter to use the selected constellation. The rate of this feedback can be very low since the fading distribution usually changes slowly over a very long period of time, depending on the environment. In this case, the converter 310 will typically store a number of possible constellations to be used, and the feedback circuit simply advises the converter which of these constellations to utilize based on the channel statistic measurements made by module 360. Alternatively, rather than making decisions based on the channel statistic measurements, the receiver can transmit the measured channel statistics to the transmitter. The transmitter can then select the best multidimensional constellation to use based on the received feedback. The transmitter will then inform the receiver as to the selected multidimensional constellation. Either way, such feedback can supplement, or in some embodiments eliminate the need for, the channel state information (CSI) module at the transmitter. Accordingly, some embodiments provide transmit diversity when there is no CSI at the transmitter. Alternatively, the transmitter can change the constellation, forward error correction and other parameters of the system based on the user location, which can be known for the transmitter, without utilizing the feedback loop regarding the statistics of the channel. This can be useful if the system can make decisions based on known or anticipated conditions at that location.

In addition to selecting the multidimensional constellation to use, some embodiments can utilize the feedback circuit 380 to change a number of other parameters related to transmitting and receiving. For example, one such parameter is the forward error correction code to be used. In some embodiments, the forward error correction code can be designed or optimized based on a target error rate or throughput for a specific channel statistic e.g. Nakagami-m channel with specific m e.g. m=1,2, . . . 10. Accordingly, some embodiments use an optimized multidimensional constellation and in addition use an optimized forward error correction code for that optimized constellation. In such an embodiment, it is advantageous to change the forward error correction code to correspond to a change in constellation.

Other possible parameters include the number of timeslots or the number of pilots for estimation of channel. Other parameters include the number of transmit and receive antennas (for embodiments in which a subset can be utilized). Other parameters include the number of dimensions (M) and the number of resources for carrying different components of a multidimensional constellation based on the channel statistics. For example, for a Nakagami-m channel environment, the factor m can be varied. In other embodiments, the transmitter can select from these parameters and instruct the receiver.

However, such a feedback channel is not always needed. Some embodiments can accommodate existing wireless terminals which are not equipped to provide such a feedback channel. In such a case, a single multidimensional constellation is used. For some embodiments, a constellation which offers good Signal to Noise Ratio (SNR) characteristics over a broad range of channel conditions is chosen. Such a constellation can be chosen as an initial constellation for embodiments which do utilize feedback.

Figure 5:
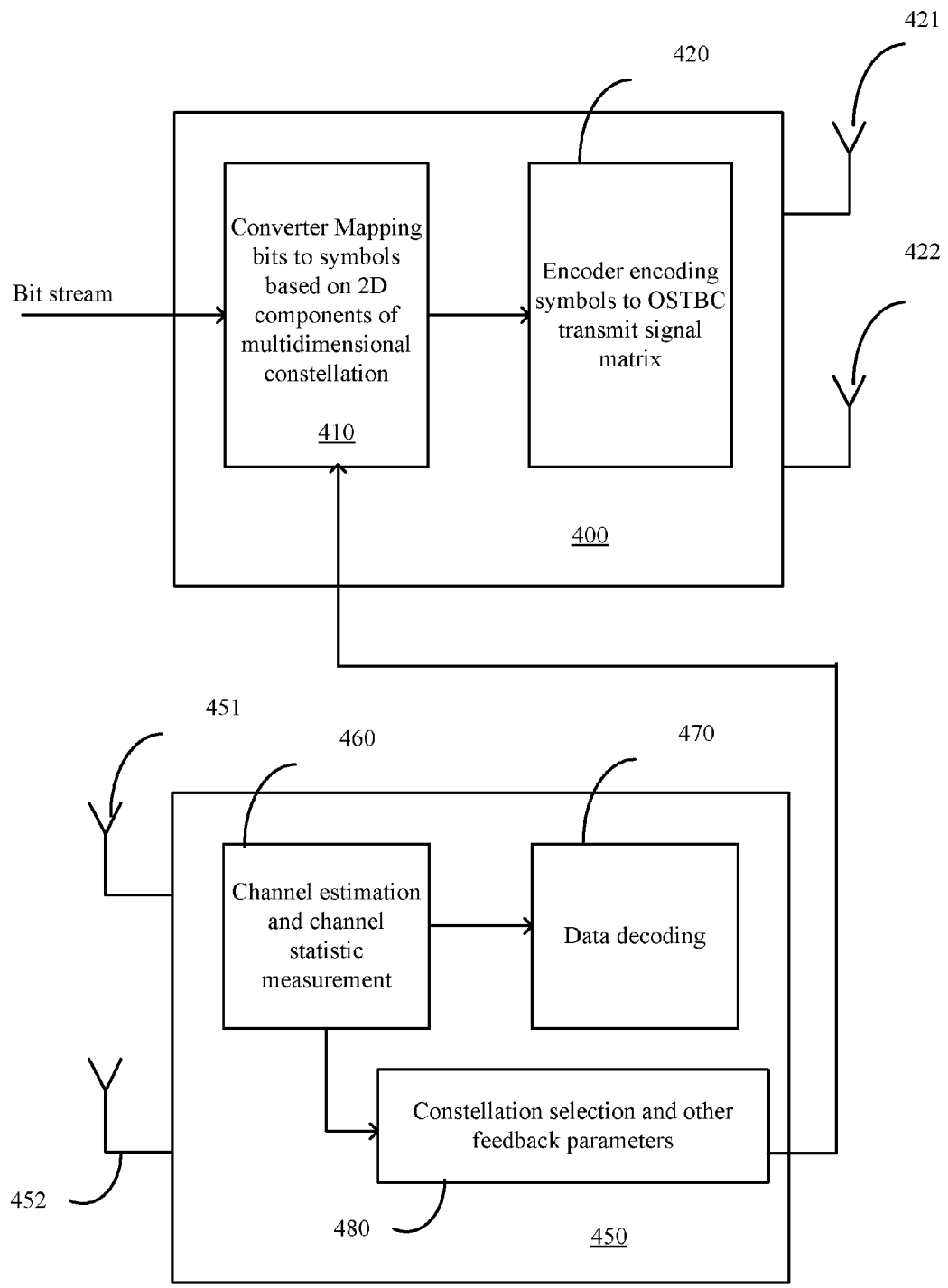
FIG. 5 is a block diagram illustrating a wireless system having a transmitter and receiver according to an alternative embodiment.

FIG. 5 is a block diagram illustrating a wireless system having a transmitter and receiver according to an alternative embodiment. Transmitter 400 converts and encodes a bitstream via transmit antennas 421 . . . 422. Once again, a different number of antennas may be used. The transmitter includes a converter module 410 for mapping a data block (a set of bits from the bitstream) into a set of 2D symbols derived from a multidimensional constellation. In some embodiments, the converter module 410 stores a codebook containing a plurality of possible multidimensional constellations to generate a multidimensional signal, which is then converted into 2D symbols. The type of multidimensional constellation used by the converter can be selected from a number of potential multidimensional constellations, based on either anticipated or measured wireless conditions. In another embodiment, the converter module 410 can be simplified to only indirectly use a multidimensional constellation by using a transformational matrix (or a precoder) which is derived from the multidimensional constellation. Rather than using an M≥3 dimensional constellation to generate M dimensional coordinates which are then converted into a set of 2D coordinates which are then encoded, such an embodiment stores a plurality of transformation matrices (or precoders) that directly map the symbols to the sets of 2D coordinates that represent the M≥3 coordinate. Such an embodiment selects an appropriate matrix (or precoder) to convert the data block into 2D symbols based on the channel feedback.

It should be appreciated that once encoder 410 has converted the data block into 2D symbols (for example symbols $s^{(1)}$, $s^{(2)}$ and $s^{(3)}$, assuming the 4 antenna, 4 timeslot, 3 symbol OSTBC for equation (4)), the encoder 420 operates in a conventional manner to encode the OSTBC matrix of equation (4). Accordingly, in this embodiment OSTBC encoder 420 can be a conventional OSTBC encoder.

In this example, the receiver 450 receives the transmitted OSTBCs via receive antennas 451 . . . 452. Receiver 450 includes channel estimation and channel statistic measurement module 460, data decoder module 470, and, in this example, feedback circuit 480 to determine what constellation the transmitter should utilize, as well as to provide system parameters to the transmitter.

It should be appreciated that the above disclosure has so far assumed multidimensional constellations are converted to 2D symbols, as current physical layer standards, and wireless systems which adhere to them, require 2D symbols. In other words, embodiments have been discussed in which a data block to be transmitted is converted into a set of 2D symbols derived from a multidimensional constellation, and then encoding the 2D symbols to form an STBC or an OSTBC. However, the methods and systems discussed herein can be generalized, should physical layer standards and systems evolve to allow for other (i.e., P-dimensional) symbols. Accordingly, while the above embodiments have been described with M=2K, other embodiments can have M=PK, with P being positive, with M≥3 and P<M. It will be understood by those skilled in the art that there is no requirement for P to be an integer. For example, if M=5 it is possible for K=3; if an M=5 dimensional point is (A, B, C, D, E), it may be represented as a pair of coordinate points (A, B, C), (C, D, E). The value 'C' is encoded into both of the coordinate points. It may be possible to take advantage of this redundancy if it is known that one of the transmission channels is particularly subject to interference. In a M=3 dimensional case, a three dimensional constellation is used, and the points (X, Y, Z) can be transmitted as (X, Y) and (X, Z). As long as both the transmitter and receiver are aware of how the M dimensional coordinate point is represented in the P dimensional coordinates, the transmission should be decodable. If M=PK, and M=3, K=2, then P is 3/2 which is clearly a non-integer value.

Figure 6:
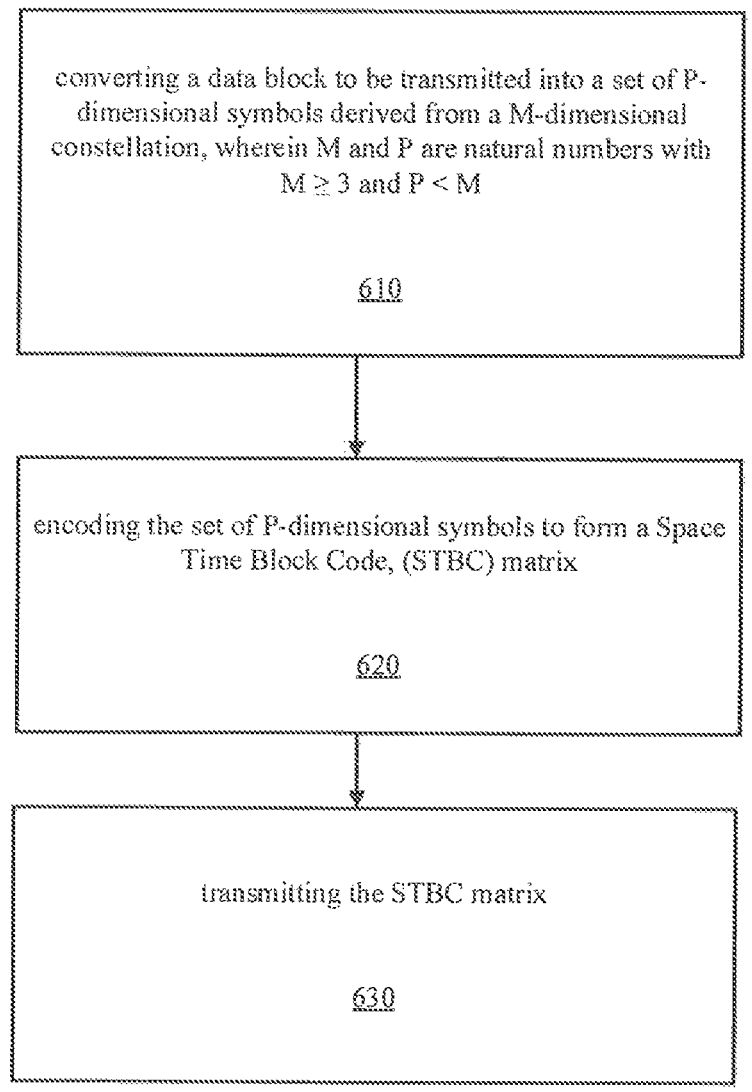
FIG. 6 is a flow chart illustrating a method according to an embodiment.

FIG. 6 is a flow chart illustrating a method according to an embodiment. Such a method can be implemented by a transmitter, for example the transmitter of FIG. 4. Such a method includes step 610 of converting a data block to be transmitted into a set of P-dimensional symbols derived from an M-dimensional constellation, wherein M≥3 and P<M. Although the discussion above assumes P=2 for 2D symbols, this is to facilitate use with current PHY layer standards. However, it should be appreciated that P can be larger than 2, provided P<M. The method also includes step 620 of encoding the set of P-dimensional symbols to form an STBC matrix, and then transmitting the STBC matrix 630. It should be appreciated that an OSTBC matrix can be utilized to facilitate decoding at the receiver.

Figure 7:
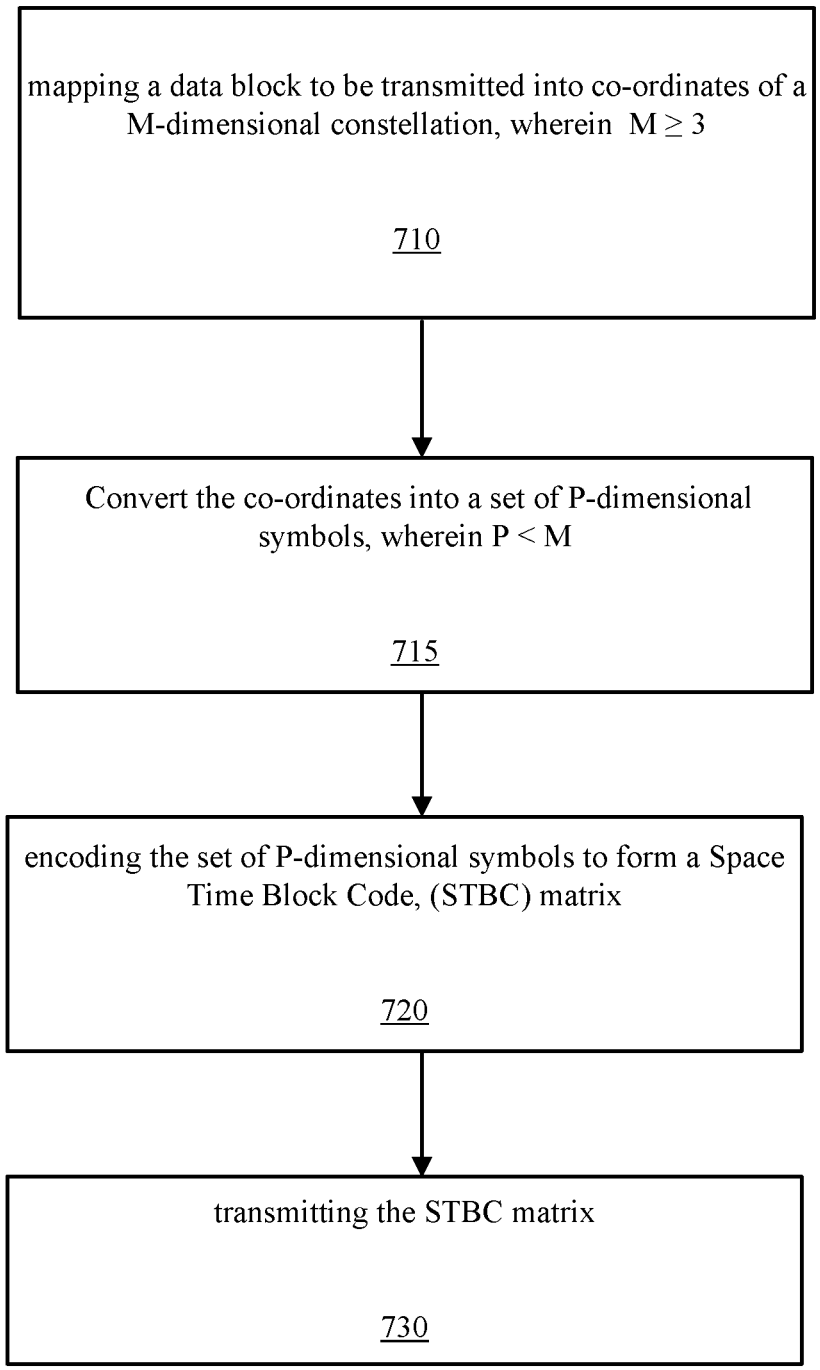
FIG. 7 is a flow chart illustrating another method according to an embodiment.

FIG. 7 is a flow chart illustrating another method according to an embodiment. Such a method can be implemented by a transmitter, for example the transmitter of FIG. 3. Such a method includes step 710 of mapping a data block to be transmitted into points in an M-dimensional constellation, wherein M≥3. The method further includes step 715 of converting these points into a set of P-dimensional symbols, wherein P<M. The method further includes step 720 of encoding the set of P-dimensional symbols to form an STBC matrix and transmitting the STBC matrix 730. Again it should be appreciated that an OSTBC matrix can be utilized to facilitate decoding at the receiver.

In some embodiments, step 610 of FIG. 6 can include steps 710 and 715 of FIG. 7. In other embodiments, to facilitate processing at the transmitter, step 610 can store a transformation matrix (or precoder) derived from an M-dimensional constellation for converting the data block into P-dimensional symbols. In this case, some embodiments can store a plurality of transformational matrices (or precoders) corresponding to a plurality of M-dimensional constellations, and select the transformation matrix (or precoder) best suited to the wireless conditions.

A method according to another embodiment includes mapping a data block to be transmitted to an M-dimensional co-ordinate point. Such a method further includes converting the M-dimensional co-ordinate point into a plurality of P-dimensional co-ordinates, wherein M≥3 and P<M. Such a method further includes transmitting the P-dimensional co-ordinates. A non-limiting example consistent with such a method is now provided. Such an example is directed to a six dimensional (6D) space, which can be thought of as a 6D constellation. A point in such a 6D space can be represented by 6 co-ordinates, such as [A, B, C, D, E, F]. Such a point can be transformed into a plurality of smaller dimensional co-ordinate systems. For example, such a point can be transformed into two 3D points: [A, B, C] and [D, E, F]. As another example, such a point can be transformed into three 2D points: [A, B], [C, D] and [E, F], which can be transmitted using conventional 2D systems.

Decoding complexity for the receiver will now be discussed.

General ML decoder for STBCs like most of algebraic codes:

$$\sum_{l=1}^{L}\sum_{j=1}^{N_r}\left|r_l^j - \sum_{i=1}^{N_t}h_{i,j}c_l^i\right|^2$$

Simplified ML decoder for OSTBC:

$$|P_k - x|^2 + \left(-1 + \sum_{i,j}\alpha_{i,j}^2\right)|x|^2 P_k = \sum_{l=1}^{L}\sum_{j=1}^{N_r}F_{l,k}(r_l^j)F_{l,k}(h_{i,j}^*)\delta_l^j$$

Simplified decoder for multidimensional constellations, according to an embodiment:

$$\sum_{k=1}^{K}|P_k - x_k|^2 + \left(-1 + \sum_{i,j}\alpha_{i,j}^2\right)|x_k|^2$$

Wherein K=the number of different 2D subconstellations, which is also equal to the number of 2D symbols.

Given the above, it can be seen that for many systems, the decoding complexity of the multidimensional constellation approach is generally greater than OSTBC but generally less than that required for algebraic codes.

By denoting $c_i^l$ as the space-time code 2D symbol transmitted in time slot l from antenna i, the general ML decoding rule in the receiver for the transmission of codeword $c = c_1^1 c_2^1 \ldots c_{N_t}^1 \ldots c_1^L c_2^L \ldots c_{N_t}^L$ in a L×$N_t$ space-time block using perfect channel state information can be expressed as the minimization of the following metric over all constellation points:

$$\sum_{l=1}^{L}\sum_{j=1}^{N_r}\left|r_l^j - \sum_{i=1}^{N_t}h_{i,j}c_l^i\right|^2 \quad (6)$$

In the above, $r_j^l$ is the received sample on the $j^{th}$ antenna in time slot l. By using the orthogonal structure of OSTBCs, a simplified ML decoder can detect $s_k$ according to $$\hat{s}_k = \underset{\forall s \in S_2}{\operatorname{argmin}}\left|P_k - \left(\sum_{i,j}\alpha_{i,j}^2\right)s\right|^2 \quad (7)$$

where $$P_k = \sum_{j=1}^{N_r}\sum_{l=1}^{L}\sum_{i=1}^{N_t}F_k^{l,i}(r_j^l h_{i,j}^*) \quad (8)$$

In (8), k=1, 2, ..., K shows the index of the different 2D symbols carried by one OSTBC block and $F_{i,k}^l(z)$ can be evaluated as $$F_k^{l,i}(z) = \begin{cases} z & \text{if } c_l^i = s_k \\ z^* & \text{if } c_l^i = s_k^* \\ -z & \text{if } c_l^i = -s_k \\ -z^* & \text{if } c_j^i = -s_k^* \\ 0 & \text{otherwise} \end{cases} \quad (9)$$

This simplified decoder can be used for decoding the multidimensional constellations by changing (7) into a summation of decoding of different 2D components of the multidimensional constellations as $$\hat{s}_k = \underset{\forall s \in S_{2K}}{\arg\min} \sum_{k=1}^{K} \left| P_k - \left( \sum_{i,j} \alpha_{i,j}^2 \right) s^{(k)} \right|^2 \quad (10)$$

Note that the term $P_k$ need only be computed once for each k, as this decreases the complexity of decoding substantially in comparison to the high performance complex codes such as the perfect codes in which (6) may need to be computed for all points of a constellation.

To achieve better performance with multidimensional constellations, some embodiments optimize the placement of multidimensional symbol points in the signal space by using knowledge about the distribution of the fading channel. Some embodiments utilize a method for this optimization based on minimizing a bound on the error probability. The output of the optimization problem can in general be an irregular constellation. Irregular constellations, in some circumstances, are capable of improving performance in comparison to regular or isometric constellations.

An upper bound for the error performance of the scheme, based on the constellation points, is derived in this section. An appropriate bound, related to the fading distribution, is used to design optimized regular and irregular multidimensional constellations for OSTBCs. When used in OSTBCs, the resulting constellations provide significantly better performance than prior art techniques, according to simulation data.

Based on the orthogonal structure of the OSTBC, its pairwise error probability can be expressed as $$P(s \to \hat{s} \mid H) = Q\left(\sqrt{\left[\frac{\sum_{j=1}^{N_r} \sum_{i=1}^{N_t} \alpha_{i,j}^2}{2N_0}\right] \sum_{k=1}^{K} |s^{(k)} - \hat{s}^{(k)}|^2}\right) \quad (11)$$

where $Q(\bullet)$ is the Gaussian tail function, and $\alpha$ is a random variable representing channel gain which has a specific distribution corresponding to the channel statistics. By using the Chernoff bound, (11) can be upper bounded as $$P(s \to \hat{s} \mid H) \leq \exp\left(-\sqrt{\left[\frac{\sum_{j=1}^{N_r} \sum_{i=1}^{N_t} \alpha_{i,j}^2}{4N_0}\right] \sum_{k=1}^{K} |s^{(k)} - \hat{s}^{(k)}|^2}\right) \quad (12)$$

By considering the exponential distribution of $\alpha_{ij}^2$, the pairwise error probability (11) can be upper bounded further as $$P(s \to \hat{s}) \leq \frac{4^{N_t N_r}}{\prod_{j=1}^{N_r} \prod_{i=1}^{N_t} \left( \bar{\gamma}_{i,j} \sum_{k=1}^{K} |s^{(k)} - \hat{s}^{(k)}|^2 + 4 \right)} \quad (13)$$

where $$\bar{\gamma}_{i,j} = \frac{E[|\alpha_{i,j}|^2]}{N_0}$$

is the average SNR of each path. This in turn can be bounded by $$P(s \to \hat{s}) \leq \frac{4^{N_t N_r}}{\left( \prod_{j=1}^{N_r} \prod_{i=1}^{N_t} \bar{\gamma}_{i,j} \right) \left( \sum_{k=1}^{K} |s^{(k)} - \hat{s}^{(k)}|^2 \right)^{N_t N_r}} \quad (14)$$

From (14), the corresponding union bound on the symbol error rate (SER) can be written as $$P_s < \frac{1}{2^d} \sum_{v=1}^{2^d} \sum_{v'=1, v' \neq v}^{2^d} \frac{4^{N_t N_r}}{\bar{\gamma} \left( \sum_{k=1}^{K} |s_v^{(k)} - s_{v'}^{(k)}|^2 \right)^{N_t N_r}} \quad (15)$$

where $\bar{\gamma}$ is defined as $$\bar{\gamma} = \prod_{j=1}^{N_r} \prod_{i=1}^{N_t} \bar{\gamma}_{i,j} \quad (16)$$

Accordingly, multidimensional constellations can be designed to outperform widely used 2D QAM constellations. The outcome of optimization can be either a regular or an irregular constellation. The constellation can generally be optimized to minimize symbol error rate (SER), block error rate (BLER), or bit error rate. In an embodiment in each space-time block, only one multidimensional symbol is transmitted. Accordingly, in this example, the SER and BLER of the STBC block are identical. Therefore, the above bound can be used for finding the locally optimum constellations for minimizing the BLER.

The use of multidimensional constellations in orthogonal codes provides an opportunity for optimizing constellation points. For finding optimized constellations, the union bound (15) on the BLER is minimized. To improve the performance by maximizing the shaping gain instead of increasing the power, the constraint used in one optimization according to an embodiment of multidimensional constellations is that the average power of the constellation points is limited to one. The problem is generally nonlinear but can be solved with a general global optimization solver. The optimization problem can be stated as $$\underset{s_v^{(k)}}{\text{minimize}} \sum_{v=1}^{2^d} \sum_{v'=1, v' \neq v}^{2^d} \frac{C}{\left(\sum_{k=1}^{K} |s_v^{(k)} - s_{v'}^{(k)}|^2\right)^{N_t N_r}}, \quad (17)$$
$$\forall k \in \{1, \ldots, K\}$$
$$\forall v \in \{1, \ldots, 2^d\}$$

subject to $$\frac{1}{2^d K} \sum_{v=1}^{2^d} \sum_{k=1}^{K} |s_v^{(k)}|^2 \leq 1,$$

$$s_v^{(k)} \in \mathbb{C} \ \forall k$$

Where $$C = \frac{4^{N_t N_r}}{2^d \bar{\gamma}},$$

which does not affect the optimization. To initiate the optimization problem solver with a good starting point, all 2D constellations are initially selected from rectangular QAM constellations and, by keeping the position of the points constant, their labels are optimized. Embodiments can use an exhaustive search for small constellations, a branch-and-bound method for medium-size constellations or a random search for large constellations to find either a globally or locally optimized solution for the labeling problem. In the next step, the optimization problem solver provides irregular constellations distributed in the 2K-dimensional space. Note that (17) does not depend on $\bar{\gamma}$ and therefore the output of the optimization is an SNR independent constellation.

Some embodiments optimize the constellation based on the statistics of the channels and the upper bound of error rate in (15), as described above. In practice, the distribution of alpha may be unknown, but embodiments can assume a statistical model and estimate the parameters of this model. Alternatively, some embodiments can optimize the constellation for each specific channel, in which case (11) will be used to optimize the constellation. It should be noted that there can be a large number of possible multidimensional constellations. Accordingly, embodiments can utilize a pre-designed codebook with a fixed number of multidimensional constellations to be used in converter 310 of FIG. 4. Depending on the channel realization (e.g. based on the measured channel statistics), embodiments select a suitable constellation from the predesigned multidimensional constellation. Alternatively, the transformational matrices (or precoders) derived from the fixed number of multidimensional constellations used by converter 410 of FIG. 5 can be used.

When optimizing, two energy constraints were tested: constant average energy for each 2D subconstellation and constant average energy for the multidimensional constellation. The performance of both cases was very close in simulations.

By using the multidimensional constellations with OSTBC, high performance improvements can be achieved at the expense of increasing the complexity of decoding. By increasing the dimensionality of the constellation, there is more space for points to be further apart and this improves the performance even though the size of the employed OSTBC, including the number of antennas and the number of time slots, may be increased. Indeed, this is the main reason that schemes $G_2$ and $G_3$ provide more gain in comparison to $G_1$.

Some embodiments use 2D symbols of an OSTBC to carry dependent 2D components of a multidimensional constellation. However, alternatively, in an OSTBC with a large number of transmit antennas and/or time slots (e.g. 50 antennas and 100 time slots with 50 2D symbols), the scheme need not employ all independent symbols together (e.g. all 50 2D symbols). By employing just some of these symbols, there would be a performance improvement over an OSTBC with 2D QAM constellations.

Further, for large systems, the number of dimensions of the multidimensional system can be quite large. For example, for an example OSTBC with K=20, L=30, and $N_t$=6, then a forty-dimensional (40D) constellation can be used for embodiments which have M=2K. However, an OSTBC that carries a large number of 2D symbols can be partitioned in several ways based on performance complexity trade-off to be used with multidimensional constellations. Accordingly, to reduce complexity, some embodiments can subdivide large multidimensional constellations into a set of smaller constellations. For example, embodiments could use two twenty-dimensional (20D) constellations, or four ten-dimensional (10D) constellations, or even twenty 2D constellations (which would be the same as is done traditionally with STBCs). However, the larger the number of dimensions, the better the performance gain over the traditional method, so embodiments can be designed based on the tradeoff between complexity and performance. Furthermore, one could use different combinations of constellations, such as one 20D constellation and two 10D constellations.

For multiple access-like schemes, for example SFBC in OFDMA, data can be scheduled and sent based on their importance by using different size constellations.

Other features include, for some embodiments, relatively simple decoding. For example, some embodiments benefit from the simplified decoder of OSTBC for converting a faded received matrix to an unfaded one.

Bounds have been discussed for the bit, symbol and block error rates. Embodiments utilize an appropriate bound, related to the fading distribution, design and/or select optimized multidimensional constellations for OSTBCs, which can be regular or irregular.

The resulting constellations can improve the performance of OSTBCs. However, the methods discussed herein can be extended to other MIMO schemes, such as V-BLAST or quasi-orthogonal STBC.

The methods and systems described herein are generally applicable to wireless base-stations and terminals.

Figure 8:
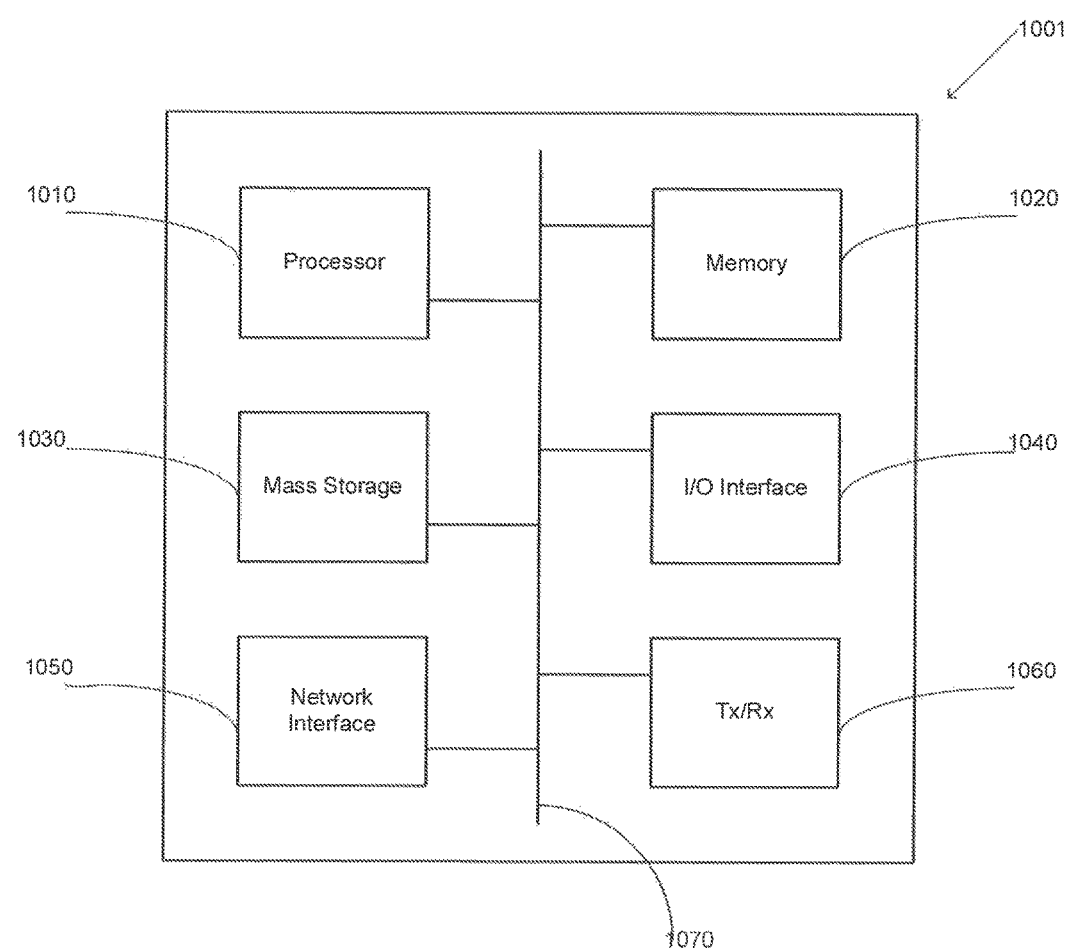
FIG. 8 is a block diagram illustrating a transmitter according to an embodiment.

FIG. 8 is an exemplary block diagram of a processing system 1001 that may be used for implementing the transmitters and receivers described. As shown in FIG. 8, processing system 1001 includes a processor 1010, working memory 1020, non-transitory storage 1030, network interface, I/O interface 1040, and, depending on the node type, transceiver 1060, all of which are communicatively coupled via bi-directional bus 1070.

According to certain embodiments, all of the depicted elements may be utilized, or only a subset of the elements. Further, the processing system 1001 may contain multiple instances of certain elements, such as multiple processors, memories, or transceivers. Also, elements of processing system 1401 may be directly coupled to other components without the bi-directional bus.

The memory may include any type of non-transitory memory such as static random access memory (SRAM), dynamic random access memory (DRAM), synchronous DRAM (SDRAM), read-only memory (ROM), any combination of such, or the like. The mass storage element may include any type of non-transitory storage device, such as a solid state drive, hard disk drive, magnetic disk drive, optical disk drive, USB drive, or any computer program product configured to store data and machine executable program code. According to certain embodiments, the memory or mass storage have recorded thereon statements and instructions executable by the processor for performing the aforementioned functions and steps.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can include the device memory as described above, or stored in removable memory such as compact disk read-only memory (CD-ROM), flash memory, or removable hard disk. The software product includes a number of instructions that enable a computer device (computer, server, or network device) to execute the methods provided in the embodiments of the present disclosure. For example, such an execution may correspond to a simulation of the logical operations as described herein. The software product may additionally or alternatively include a number of instructions that enable a computer device to execute operations for configuring or programming a digital logic apparatus in accordance with embodiments of the present disclosure.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

Although the present disclosure has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

The invention claimed is:

1. A method for wireless transmission comprising:
    receiving, by a transmitter of a wireless system, a feedback signal from a receiver, the feedback signal dependent on channel statistic measurements measured by the receiver;
    selecting, by the transmitter, an M-dimensional constellation from a group of possible M-dimensional constellations based on the wireless conditions affecting the wireless transmission as indicated by the feedback signal;
    converting, by the transmitter, a data block to be transmitted into a set of P-dimensional symbols derived from the M-dimensional constellation, wherein $M \geq 3$ and $P < M$;
    encoding, by the transmitter, the set of P-dimensional symbols to form a Space Time Block Code (STBC) matrix; and
    transmitting, by the transmitter, the STBC matrix.

2. The method of claim 1 wherein encoding forms an Orthogonal STBC (OSTBC) matrix and wherein the STBC matrix that is transmitted is the OSTBC matrix.

3. The method of claim 1 wherein M=PK, with K being the number of symbols.

4. The method of claim 3 wherein P=2 and the 2-dimensional (2D) symbols are 2D components of the M-dimensional constellation.

5. The method of claim 4, wherein the data block is converted into groups of d bits and mapped to K 2D symbols of different 2D constellations which are projections of the M-dimensional constellation with M=2K.

6. The method of claim 5, wherein the K 2D symbols are encoded to form an OSTBC matrix such that 2D symbols of the OSTBC matrix carry dependent 2D components of the M-dimensional constellation.

7. The method of claim 6 wherein the 2D components include a real and an imaginary component.

8. The method of claim 7 wherein selecting comprises selecting the M-dimensional constellation from a group of possible M-dimensional constellations based on anticipated conditions which can affect the wireless channel.

9. The method of claim 7 wherein the feedback signal dependent on the channel statistic measurements measured by the receiver comprises the M-dimensional constellation determined by the receiver based on the channel static measurements measured by the receiver.

10. The method of claim 9 wherein selecting comprises selecting the M-dimensional constellation dependent on a distribution of fading channel coefficients.

11. The method of claim 9 wherein the transmitter adjusts other parameters of the wireless system based on feedback relating to the other parameters received from the receiver, wherein the other parameters include one or more of:
    the number of dimensions (M);
    the number of time slots;
    the number of pilots; and
    the forward error correction codes to be used.

12. The method of claim 9, wherein the transmitter further selects a forward error correction code to be used which corresponds to the selected M-dimensional constellation.

13. The method of claim 9, wherein selecting comprises selecting the M-dimensional constellation to optimize the M-dimensional constellation based on a bound on a performance of the possible M-dimensional constellations and by using a constant average energy for the possible M-dimensional constellations.

14. The method of claim 6 wherein said M-dimensional constellation is regular or irregular.

15. A transmitter for a wireless system, the transmitter comprising:
    a plurality (N) of transmit antennas for wireless transmission;
    a converter for mapping a data block to two dimensional (2D) symbols derived from an M-dimensional constellation selected from a number of potential M-dimensional constellations, based on wireless conditions affecting the wireless transmission as indicated by a feedback signal received from a receiver, the feedback signal dependent on channel statistic measurements measured by the receiver; and
    a space time block code (STBC) encoder for encoding the 2D symbols onto an STBC transmit matrix for transmission by the N transmit antennas.

16. The transmitter of claim 15 wherein the converter utilizes a transformation matrix derived from the M-dimensional constellation for mapping the data block to the 2D symbols.

17. The transmitter of claim 16 wherein the converter selects the transformation matrix from a plurality of transformation matrices corresponding to a plurality of the potential M-dimensional constellations.

18. The transmitter of claim 17 further comprising a receive interface for receiving the feedback signal from the receiver, the feedback signal indicating which of the plurality of transformational matrices to select.

19. The transmitter of claim 18 further comprising:
a processor; and
machine readable memory storing machine executable instructions for implementing the converter and the STBC encoder.

20. A receiver for a wireless system,
the receiver comprising:
a plurality of receive antennas;
a channel statistics module for measuring channel statistics; and
a feedback module for providing a feedback signal to a transmitter as to which of a plurality of multidimensional constellations to use for transmission dependent on the measured channel statistics;
wherein the feedback module also provides feedback relating to other parameters of the system based on the measured channel statistics; wherein the other parameters are selected from the list comprising:
the number of dimensions (M);
the number of time slots;
the number of pilots; and
the forward error correction codes to be used.

21. A method of transmission comprising:
receiving, by a transmitter of a wireless system, a feedback signal dependent on channel statistic measurements measured by a receiver;
mapping, by the transmitter, a data block to be transmitted to an M-dimensional co-ordinate point based on wireless conditions affecting wireless transmission of the transmitter as indicated by the feedback signal;
converting, by the transmitter, the M-dimensional co-ordinate point into a plurality of P-dimensional co-ordinates, wherein M≥3 and P<M; and
transmitting, by the transmitter, the P-dimensional co-ordinates.

\* \* \* \* \*